(12) United States Patent
Leobandung

(10) Patent No.: US 9,779,355 B1
(45) Date of Patent: Oct. 3, 2017

(54) BACK PROPAGATION GATES AND STORAGE CAPACITOR FOR NEURAL NETWORKS

(71) Applicant: INTERNATIONAL BUSINESS MACHINES CORPORATION, Armonk, NY (US)

(72) Inventor: Effendi Leobandung, Stormville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/266,332

(22) Filed: Sep. 15, 2016

(51) Int. Cl.
    *G06N 3/08*      (2006.01)
    *G06N 3/04*      (2006.01)

(52) U.S. Cl.
    CPC ............... *G06N 3/084* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 5,479,578 A * | 12/1995 | Engeler | G06N 3/0635 706/34 |
| 2002/0087221 A1 | 7/2002 | Keeler et al. | |
| 2003/0154175 A1 | 8/2003 | Shi et al. | |
| 2008/0089110 A1 * | 4/2008 | Robinett | B82Y 10/00 365/148 |
| 2012/0078436 A1 | 3/2012 | Patel | |

(Continued)

FOREIGN PATENT DOCUMENTS

| | | |
|---|---|---|
| WO | 2007106942 A1 | 9/2007 |
| WO | 2009002758 A1 | 12/2008 |

(Continued)

OTHER PUBLICATIONS

Paulin et al, "Solar Photovoltaic Output Power Forecasting Using Back Propagation Neural Network", ICTACT Journal on Soft Computing 6.2, 2016, pp. 1144-1152.

(Continued)

*Primary Examiner* — Kakali Chaki
*Assistant Examiner* — Eric Nilsson
(74) *Attorney, Agent, or Firm* — Cantor Colburn LLP; Louis Percello

(57) ABSTRACT

Technical solutions are described for implementing a neural network. An example system includes a crosspoint array including a plurality of nodes, each node representing a weight assigned to a neuron of the neural network. The system also includes a capacitor associated with a set of nodes from the plurality of nodes, where the capacitor is configured to store a current value corresponding to a sum of outputs from each respective node from the set of nodes. The system also includes a clocking circuit that initiates a forward pass to propagate the current value stored in the capacitor to a subsequent layer of the neural network. The clocking circuit further initiates a backward pass to propagate the current value stored in the capacitor to a preceding layer of the neural network. The clocking circuit further initiates a weight-update pass to update the weights in the neural network.

12 Claims, 10 Drawing Sheets

(56) References Cited

U.S. PATENT DOCUMENTS

2015/0106314 A1* 4/2015 Birdwell ............... G06N 3/063
                                                    706/25
2015/0106316 A1  4/2015 Birdwell et al.
2016/0049195 A1* 2/2016 Yu ...................... G11C 13/0026
                                                    365/63

FOREIGN PATENT DOCUMENTS

WO   2014140541 A2   9/2014
WO   2015148224 A2   10/2015

OTHER PUBLICATIONS

Yu et al., "Identification of Tea Storage Times by Linear Discrimination Analysis and Back-Propagation Neural Network Techniques Based on the Eigenvalues of Principal Components Analysis of E-Nose Sensor Signals", Sensors 9, 2009, pp. 8073-8082.

* cited by examiner f(x) = f (INPUT 1 * CONNECTION STRENGTH 1 + INPUT 2 * CONNECTION STRENGTH 2)

US 9,779,355 B1

BACK PROPAGATION GATES AND STORAGE CAPACITOR FOR NEURAL NETWORKS

BACKGROUND

The present invention relates in general to trainable crossbar arrays of crosspoint devices, and particularly to artificial neural networks (ANNs) formed from crossbar arrays.

"Machine learning" is used to broadly describe a primary function of electronic systems that learn from data. In machine learning and cognitive science, ANNs are a family of statistical learning models inspired by the biological neural networks of animals, and in particular the brain. ANNs can be used to estimate or approximate systems and functions that depend on a large number of inputs and are generally unknown. Crossbar arrays are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

SUMMARY

According to one or more embodiments, a system for implementing a neural network includes a crosspoint array including a plurality of nodes, each node representing a weight assigned to a neuron of the neural network. The system also includes a capacitor associated with a set of nodes from the plurality of nodes, where the capacitor is configured to store a current value corresponding to a sum of outputs from each respective node from the set of nodes. The system also includes a clocking circuit that initiates a forward pass to propagate the current value stored in the capacitor to a subsequent layer of the neural network. The clocking circuit further initiates a backward pass to propagate the current value stored in the capacitor to a preceding layer of the neural network. The clocking circuit further initiates a weight-update pass to update the weights in the neural network.

According to one or more embodiments, a crosspoint array for implementing a neural network includes a set of conductive row wires, and a set of conductive column wires configured to form a plurality of crosspoints at intersections between the set of conductive row wires and the set of conductive column wires. The crosspoint array further includes a memristor at each of the plurality of crosspoints configured to store a weight of the neural network. The crosspoint array also includes a capacitor associated with a set of crosspoints from the crosspoint array, where the capacitor is configured to store a current value corresponding to a sum of outputs from each respective memristor from the set of crosspoints.

According to one or more embodiments, a non-transitory computer program product for implementing a neural network that includes a computer readable storage medium, where the computer readable storage medium includes computer executable instructions to initiate a forward pass for a crosspoint array by setting a clocking circuitry. The crosspoint array includes a set of conductive row wires, and a set of conductive column wires configured to form a plurality of crosspoints at intersections between the set of conductive row wires and the set of conductive column wires. The crosspoint array also includes a plurality of memristors, where a memristor is at each of the plurality of crosspoints, and the memristor configured to store a weight of the neural network. The crosspoint array also includes a plurality of capacitors, where a capacitor is associated with a corresponding set of crosspoints from the crosspoint array. The computer readable storage medium includes computer executable instructions to store, in the capacitor, a current value corresponding to a sum of outputs from each respective memristor from the corresponding set of crosspoints.

BRIEF DESCRIPTION OF THE DRAWINGS

The examples described throughout the present document can be better understood with reference to the following drawings and description. The components in the figures are not necessarily to scale. Moreover, in the figures, like-referenced numerals designate corresponding parts throughout the different views.

DETAILED DESCRIPTION

Figure 1:
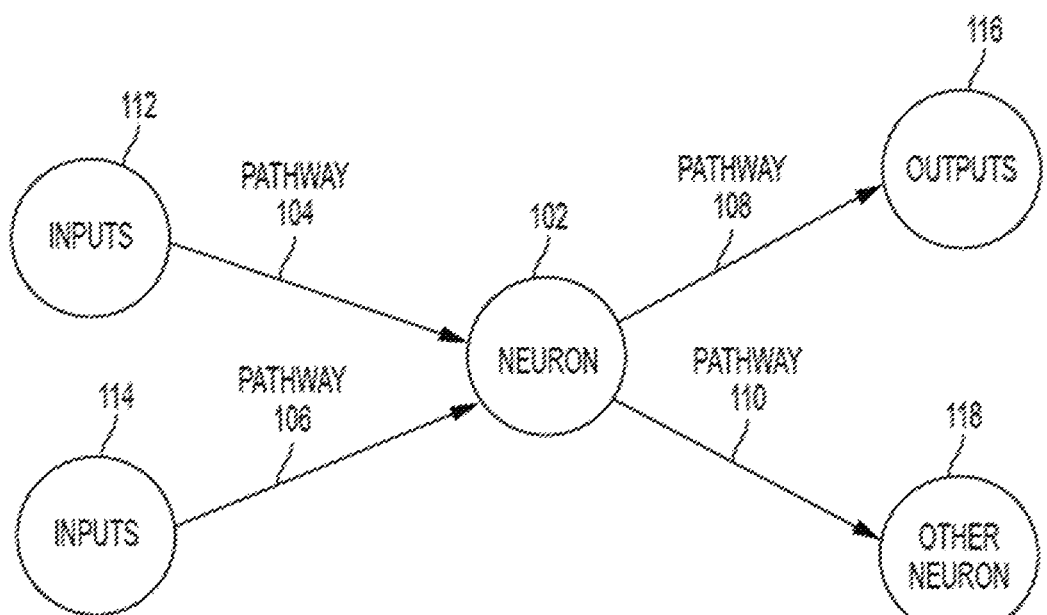
FIG. 1 depicts a simplified diagram of input and output connections of a biological neuron.

It is understood in advance that although one or more embodiments are described in the context of biological neural networks with a specific emphasis on modeling brain structures and functions, implementation of the teachings recited herein are not limited to modeling a particular environment. Rather, embodiments of the present invention are capable of modeling any type of environment, including for example, weather patterns, arbitrary data collected from the internet, and the like, as long as the various inputs to the environment can be turned into a vector.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications. Accordingly, described herein are technical solutions that facilitate training crosspoint arrays using capacitive devices (that is, capacitors) that facilitate storing output for each node at each crosspoint device. The technical solutions described herein further facilitate updating the output stored by the capacitive devices based on specific clock events. The clock events facilitate the crosspoint array that represents a neural network to propagate the stored weights from one layer of the neural network to subsequent layer during a forward and/or a backward propagation passes of training.

Although embodiments of the present invention are directed to electronic systems, for ease of reference and explanation various aspects of the electronic systems are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM™'s SyNapse™ computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
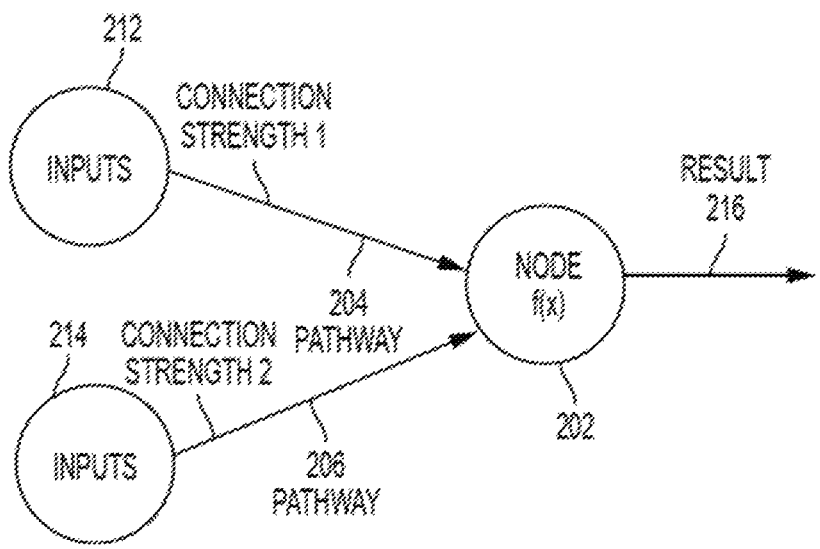
FIG. 2 depicts a known simplified model of the biological neuron shown in FIG. 1.
Figure 3:
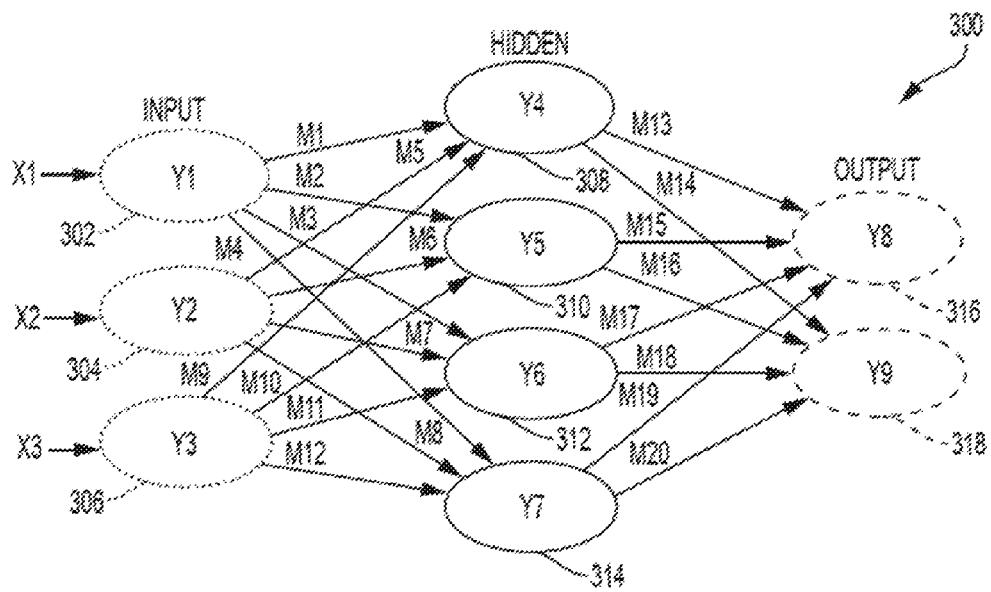
FIG. 3 depicts a known simplified model of an ANN incorporating the biological neuron model shown in FIG. 2.

A general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream output s116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present description, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it can become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm can be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire description of which is incorporated by reference herein.

As previously noted herein, in order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Figure 4:
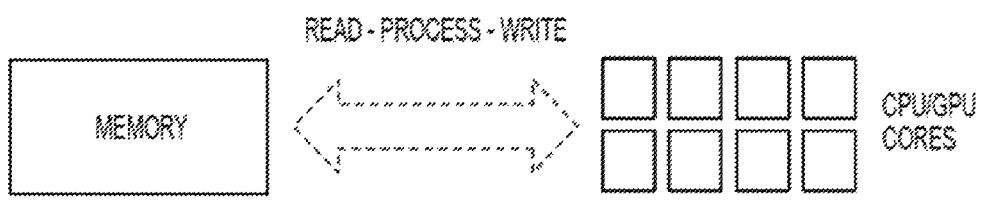
FIG. 4 depicts a simplified block diagram of a known weight update methodology.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory. Accordingly, simplifying the crosspoint devices of ANN architectures to prioritize power-saving, offline learning techniques typically means that training speed and training efficiency are not optimized.

Figure 5:
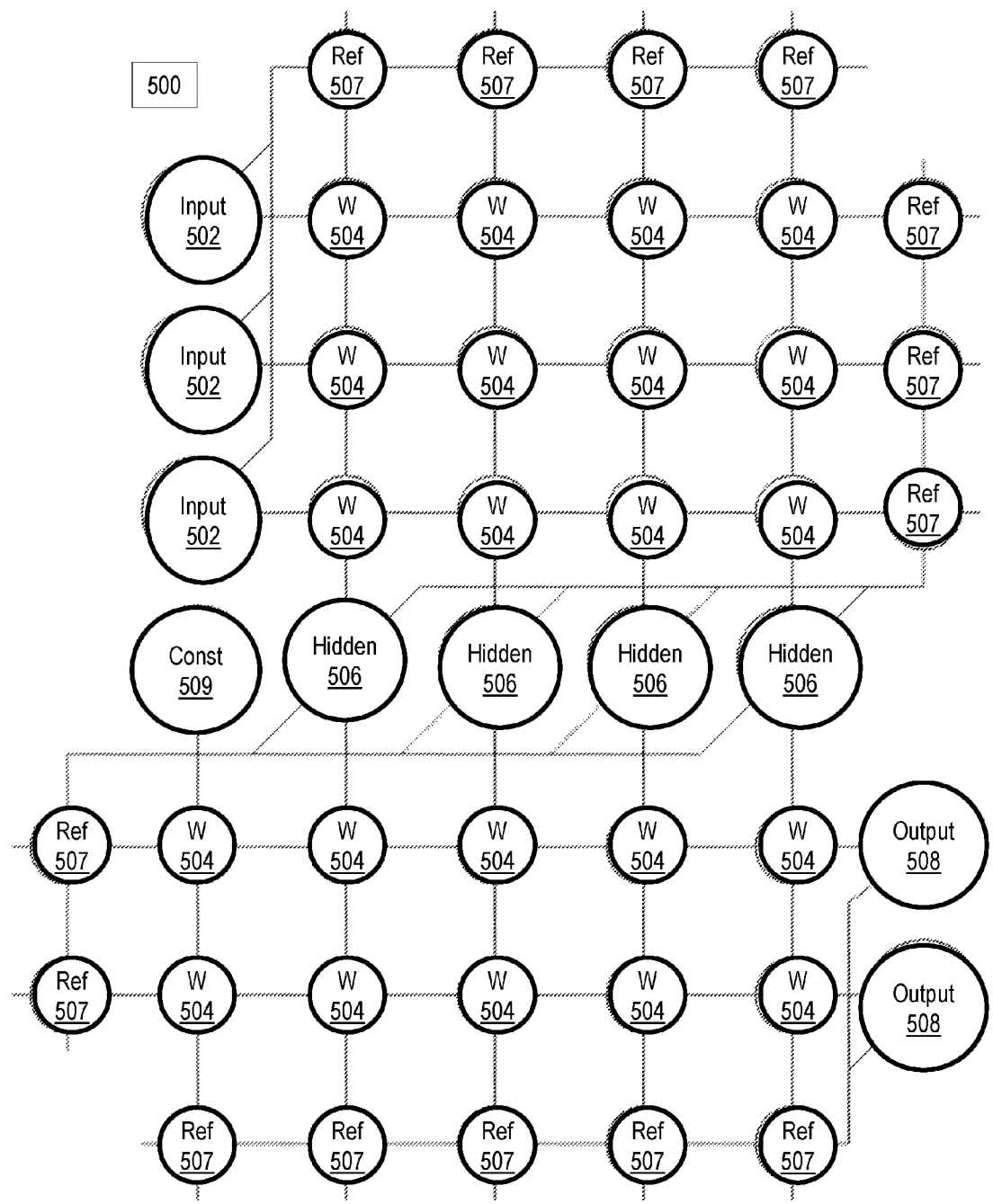
FIG. 5 is a diagram of an ANN including arrays of weights in accordance with the one or more embodiments.

FIG. 5 illustrates an artificial neural network (ANN) architecture 500. During feed-forward operation, a set of input neurons 502 each provide an input voltage in parallel to a respective row of weights 504. A weight 504 can be any nonvolatile memory such as EEPROM, ReRAM, PCM, or the like. The weights 504 each have a settable resistance value, such that a current output flows from the weight 504 to a respective hidden neuron 506 to represent the weighted input. The current output by a given weight is determined as $$I = \frac{V}{r},$$

where V is the input voltage from the input neuron 502 and r is the set resistance of the weight 504. The current from each weight adds column-wise and flows to a hidden neuron 506. A set of reference weights 507 have a fixed resistance and combine their outputs into a reference current that is provided to each of the hidden neurons 506. Because conductance values can only be positive numbers, some reference conductance is needed to encode both positive and negative values in the matrix. The currents produced by the weights 504 are continuously valued and positive, and therefore the reference weights 507 are used to provide a reference current, above which currents are considered to have positive values and below which currents are considered to have negative values.

As an alternative to using the reference weights 507, another embodiment can use separate arrays of weights 504 to capture negative values. Each approach has advantages and disadvantages. Using the reference weights 507 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 504 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 506 use the currents from the array of weights 504 and the reference weights 507 to perform some calculation. The hidden neurons 506 then output a voltage of their own to another array of weights 507. This array performs in the same way, with a column of weights 504 receiving a voltage from their respective hidden neuron 506 to produce a weighted current output that adds row-wise and is provided to the output neuron 508.

It should be understood that any number of these stages can be implemented, by interposing additional layers of arrays and hidden neurons 506. It should also be noted that some neurons can be constant neurons 509, which provide a constant voltage to the array. The constant neurons 509 can be present among the input neurons 502 and/or hidden neurons 506 and are only used during feed-forward operation.

During back propagation, the output neurons 508 provide a voltage back across the array of weights 504. The output layer compares the generated network response to training data and computes an error. The error is applied to the array as a voltage pulse, where the height and/or duration of the pulse is modulated proportional to the error value. In this example, a row of weights 504 receives a voltage from a respective output neuron 508 in parallel and converts that voltage into a current which adds column-wise to provide an input to hidden neurons 506. The hidden neurons 506 provide combine the weighted feedback signal with a derivative of its feed-forward calculation and stores an error value before outputting a feedback signal voltage to its respective column of weights 504. This back propagation travels through the entire network 500 until all hidden neurons 506 and the input neurons 502 have stored an error value.

During weight updates, the input neurons 502 and hidden neurons 506 apply a first weight update voltage forward and the output neurons 508 and hidden neurons 506 apply a second weight update voltage backward through the network 500. The combinations of these voltages create a state change within each weight 504, causing the weight 504 to take on a new resistance value. In this manner, the weights 504 can be trained to adapt the neural network 500 to errors in its processing. It should be noted that the three modes of operation, feed forward, back propagation, and weight update, do not overlap with one another.

Figure 6:
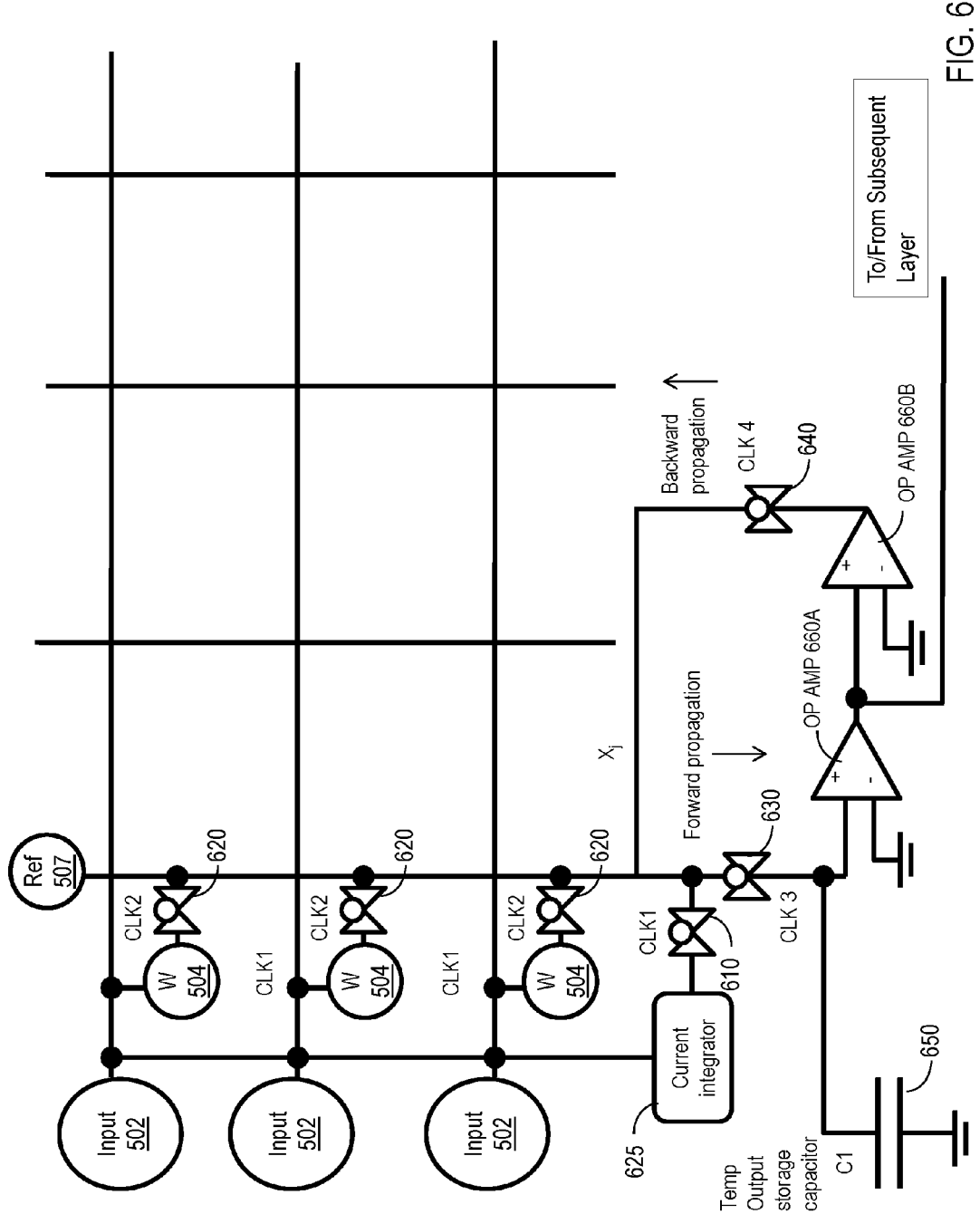
FIG. 6 is a diagram illustrating an ANN using a capacitive device to temporarily store outputs at a layer according to one or more embodiments.

FIG. 6 illustrates a neuron, which can be the input layer neuron 502, the hidden layer neuron 506, and/or the output layer neuron 508, of the ANN according to one or more embodiments of the technical solutions described herein. The neuron includes electronic circuitry that includes, among other components, clocking devices CLK1 610, CLK2 620, CLK3 630, CLK4 640, a capacitor 650, and a current integrator 625. In one or more examples, the electronic circuitry can further include one or more op-amps 660 that amplify the current (or limit the current) by scaling the input current to a predetermined range using a predetermined gain factor. It should be noted that FIG. 6 shows components to address all three phases of operation: feed forward, back propagation, and weight update. However, because the different phases do not overlap, there will necessarily be some form of control mechanism within in the neuron 506 to control which components are active based on clocking schemes. It should therefore be understood that there can be switches and other structures that are not shown in the neuron 506 to handle switching between modes.

The capacitor 650 stores the computed value for the hidden layer neuron 506. During forward propagation, the computed value from the capacitor 650 is relayed to a subsequent layer of the neural network, which can be another hidden layer, or an output layer. The forward propagation is initiated using a combination of one or more of the clocks. During backward propagation, the current integrator 625 integrates the computed value from the capacitor 650 with a current that represents a correction factor for the weights of the hidden neuron. The correction factor current is received from the subsequent layer. The backward propagation is initiated using a combination of one or more of the clocks.

Figure 7:
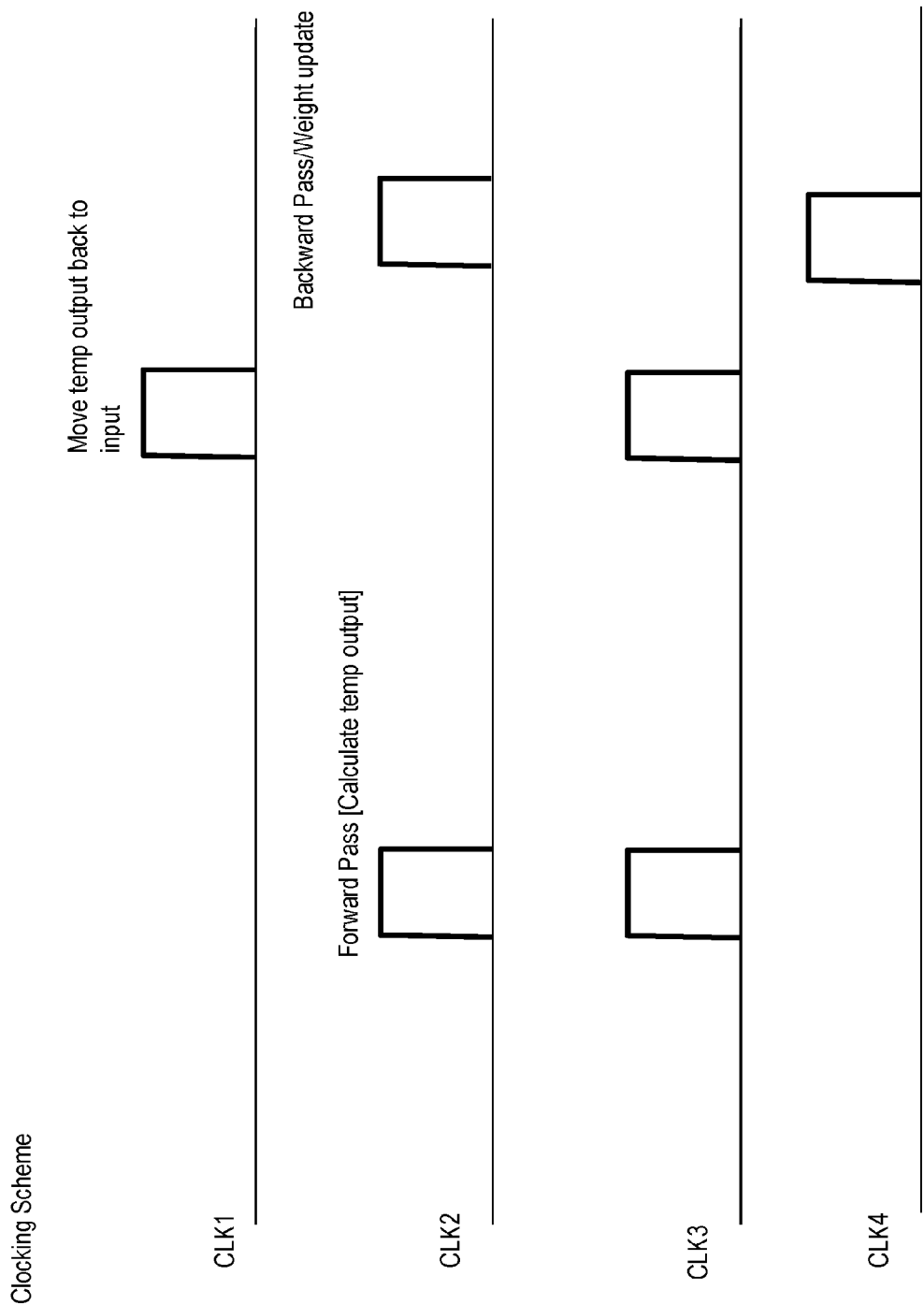
FIG. 7 illustrates an example clocking scheme for an ANN using a capacitive device to temporarily store outputs at a layer according to one or more embodiments.

FIG. 7 illustrates a clocking scheme that initiates both, the forward pass and the backward pass. Further, FIG. 8A illustrates a flowchart for a method for computing and storing an output at the hidden neuron during the forward pass; and FIG. 8B illustrates a flowchart for a method for computing and storing an output at the hidden neuron during the backward pass.

Figure 8:
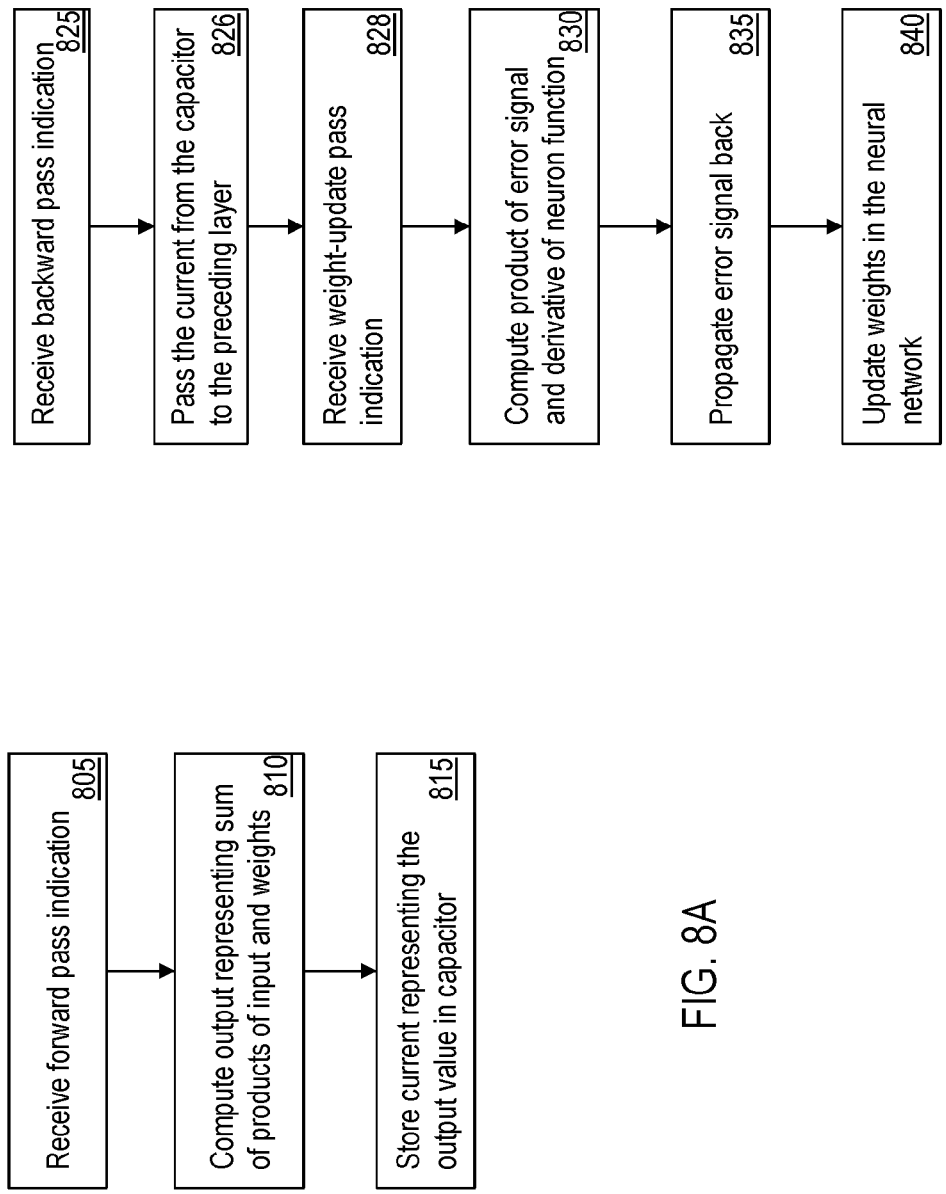
FIG. 8A illustrates a flowchart of an example method for storing an output of a layer in capacitive devices according to one or more embodiments.
FIG. 8B illustrates a flowchart of an example method for propagating an output of a layer stored in capacitive devices according to one or more embodiments.

As illustrated in FIG. 8A, the hidden layer neuron 506 receives an indication for initiating the forward pass, as shown at 805. In one or more examples the indication can be a separate signal, and in response the hidden layer neuron initiates the CLK2 620 and the CLK3 630 clock signals. Alternatively, the initiation signal includes the clock signals from CLK2 620 and CLK3 630. FIG. 7 illustrates the clock signals from CLK2 620 and CLK3 630 being set for the forward pass. It is understood that setting the clock signals includes setting the clock signals to a predetermined HIGH value, such as 1. At this time, CLK3 630 is inactive, that is, CLK3 630 is set to a predetermined LOW value, such as 0.

In response, the electronic circuitry of the neuron 506 computes the output representing sum of products of respective input values and the stored weight at the neuron 506, as shown at 810. As illustrated in FIG. 6, the clocking scheme for the forward pass facilitates the input values from input neuron 502 to be passed as input voltage, which is converted into current based on weight for the neuron 506 ($w_{ij}$). In one or more examples, the weights for the hidden layer neurons 506 can be randomly initialized. As described earlier, the output of the neuron 506 is the sum of products of the input values from a preceding layer (see FIG. 3). The output is passed to a subsequent layer of the neural network via the op-amp 660. The method further includes storing the current representing the output value in the capacitor 650, as shown at 815. The current value stored in the capacitor 650 is further used during backward pass and weight-update pass of the neural network.

Figure 9:
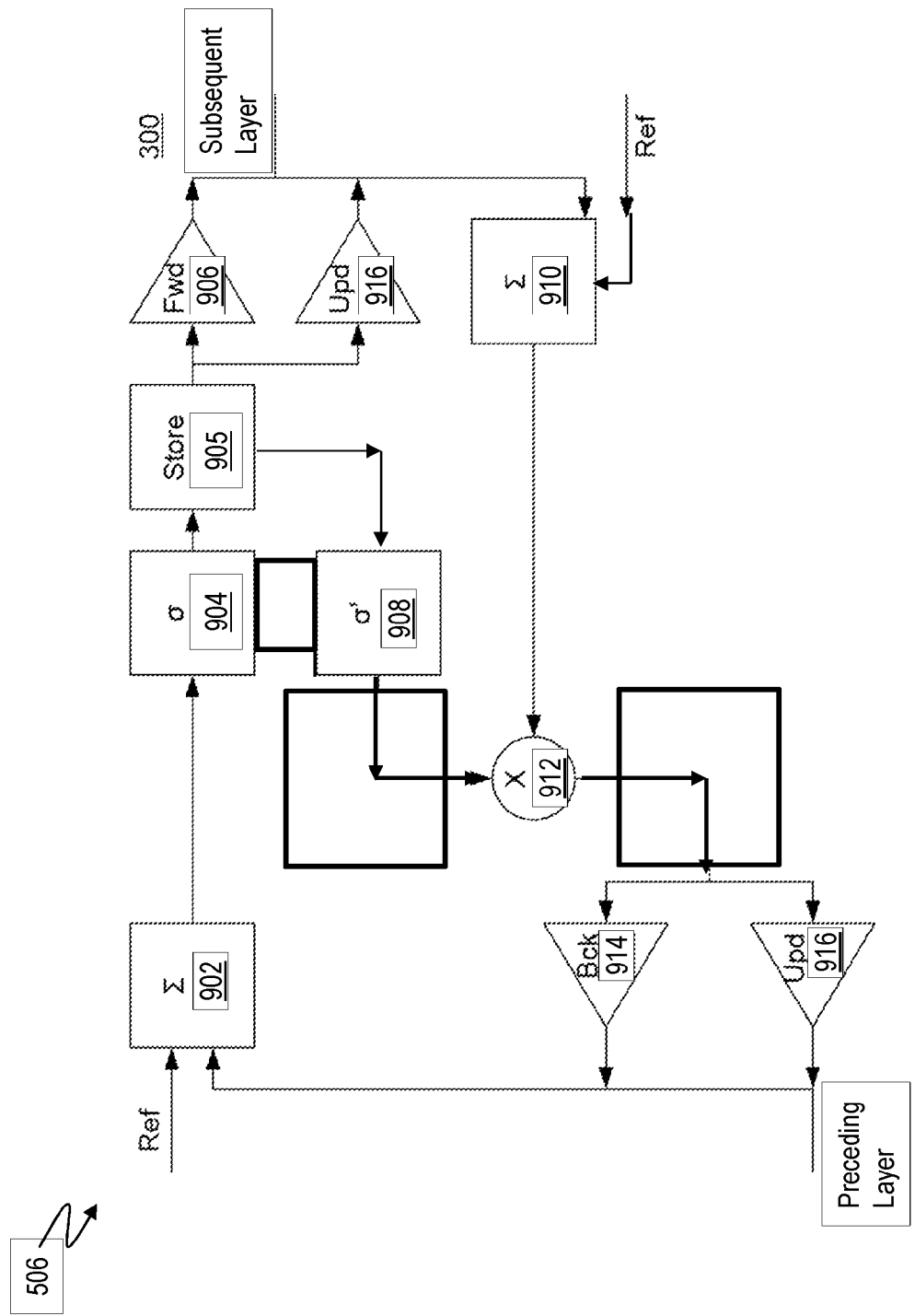
FIG. 9 is a block diagram of a neuron in an ANN in accordance with one or more embodiments.

FIG. 9 illustrates a block diagram of the electronic circuitry for performing operations for the forward pass of the hidden layer neuron 506. It is understood that the block diagram is to illustrate the operation of the hidden neuron 506, and the actual architecture of the electronic circuitry can be varied in different embodiments. During forward pass, a difference block 902 determines the values of the input 502 from the array by comparing it to the reference value 507. This sets both a magnitude and a sign (e.g., + or −) of the input to the neuron 506 from the array. Block 904 performs a computation based on the input, the output of which is stored in storage 905, which is the capacitor 650. It is specifically contemplated that block 904 computes a non-linear function and can be implemented as analog or digital circuitry or can be performed in software.

The sum of the products stored in the capacitor 650 is represented by the sum of the currents from each perceptron from all inputs 502 based on Kirchoff law. The current stored in the capacitor 650 is used as input to the subsequent layer in the forward pass. For example, the value determined by the function block 904 is converted to a voltage at feed forward generator 906, which applies the voltage to the array representing the subsequent layer of the neural network. The signal propagates this way by passing through multiple layers of arrays and neurons until it reaches the final output layer of neurons. Thus, in response to the forward pass initiation, referring to FIG. 6, the current flows from the weights 504 to, C2 620, to CLK3 630, to op-amp 660A, and to the subsequent layer. In addition, the current flows to and is stored in the C1 650. Further, the current from each of the weights 504 associated with the capacitor C1 650 is added according to Kirchoff's law and the current value corresponding to the sum is stored in the capacitor C1 650.

Now referring to FIG. 8B, the hidden layer neuron 506 receives an indication for initiating the backward pass, as shown at 825. In one or more examples the indication can be a separate signal, and in response the hidden layer neuron 506 initiates the CLK1 610 and the CLK3 630 clock signals (see clocking scheme in FIG. 7). Alternatively, the initiation signal includes the clock signals from CLK1 610 and CLK3 630. FIG. 7 illustrates the clock signals from CLK1 610 and CLK3 630 being set for the backward pass. In response, the neuron 506 passes the current value stored in the capacitor 650 back to the preceding layer (input layer), as shown at 826. Referring to FIG. 6, the current flows from C1 650, to CLK3 630, to CLK 610, the current integrator 625, and to input layer (502). The current integrator 625 converts the current from the capacitor 650 into a voltage to be feedback into the input.

Further, the hidden layer neuron 506 receives an indication for initiating the weight-update pass, as shown at 828. In one or more examples the indication can be a separate signal, and in response the hidden layer neuron 506 initiates the CLK2 620 and the CLK4 640 clock signals (see clocking scheme in FIG. 7). Alternatively, the initiation signal includes the clock signals from CLK2 620 and CLK4 640. FIG. 7 illustrates the clock signals from CLK2 620 and CLK4 640 being set for the backward pass.

In response, the electronic circuitry of the neuron 506 computes an update for weights associated with the neuron 506, as shown at 830. As illustrated in FIG. 6, the clocking scheme for the forward pass facilitates the error signal from subsequent layer to be passed to compute the updated weights for the neuron 506 ($w_{ij}$). The method further includes propagating the error signal multiplied by a derivative of the non-linear function from the previous feed forward step, as shown at 835. Further yet, the weights 504 of the neural network are updated by updating the conductance of the weights, as shown at 840.

During back propagation mode, the neuron 506 receives the error signal that is generated at the subsequent layer of neurons, for example the output layer neuron 508. Alternatively, the error signal can be computed by a separate unit that accepts inputs from the output neurons 508 and compares the output to a correct (desired) output based on the training data. The hidden layer neuron 506 further receives back propagating information from the array of weights 504. Referring to FIG. 9, the hidden layer neuron 506 compares the received information with the reference signal at a difference block 910 to provide a continuously valued, signed error signal. This error signal is multiplied by a derivative of the non-linear function from the previous feed forward step stored in the capacitor 650 using a multiplier 912, with the result being stored in the current integrator 625. The value determined by the multiplier 912 is converted to a backwards propagating voltage pulse proportional to the computed error at back propagation generator 914, which applies the voltage to the preceding layer of neurons. The error signal propagates in this way by passing through multiple layers of arrays and neurons until it reaches the layer of input neurons 502.

During weight update mode, after both forward and backward passes are completed, each weight 504 is updated proportional to the product of the signal passed through the weight during the forward and backward passes. The update signal generators 916 provide voltage pulses in both directions for hidden layer neuron 506 (though note that, for input and output neurons 502 and 508, only one direction will be available). The shapes and amplitudes of the pulses from update generators 916 are configured to change a state of the weights 504, such that the resistance of the weights 504 is updated.

In one or more examples, the actual output of last (output) layer is also stored in the capacitor 650, which is then converted to voltage. In one or more examples, the current stored in the capacitor 650 of the output layer is converted into voltage using a predetermined function. The resulting voltage is applied to left node of the corresponding weight 504. Further, the desired output is applied to the right node of corresponding weight (for example, with an optional function). If there is delta between the desired output and the actual output, which is reflected in the voltage delta between the weight nodes, the weight is updated. Such backward propagation is repeated all the way back to the input layer, and the process is repeated until the actual and desired output error level is acceptable according to a predetermined threshold.

In one or more embodiments, the weights 504 are implemented as resistive cross point devices, where their switching characteristics have a non-linearity which is used for processing data. For example, the weights 504 can be devices called a resistive processing unit (RPU), with non-linear characteristics, which are used to perform calculations in the neural network. The RPU devices can be implemented with resistive random access memory (RRAM), phase change memory (PCM), programmable metallization cell (PMC) memory, or any other device that has non-linear resistive switching characteristics. The RPU devices can also be considered as memristive systems, but they differ in their principle of operation as compared to an ideal memristor.

In one or more embodiments, the memristor can be a two-terminal RPU having a first terminal, a second terminal and an active region. The active region effects a non-linear change in a conduction state of the active region based on at least one first encoded signal applied to the first terminal and at least one second encoded signal applied to the second terminal. The active region performs a local data storage operation of a training methodology based at least in part on the non-linear change in the conduction state. The active region perform a local data processing operation of the training methodology based at least in part on the non-linear change in the conduction state.

In other words, when performing data processing, the value stored at each RPU is updated in parallel and locally, which eliminate the need to move relevant data in and out of a processor and a separate storage element. Additionally, the local data storage and local data processing provided by the described two-terminal RPUs accelerate the ANN's ability to learn and implement algorithms such as backpropagating online neural network training, matrix inversion, matrix decomposition and the like. Accordingly, implementing a machine learning ANN architecture having the described RPU enables the implementation of online machine learning capabilities that optimize the speed, efficiency and power consumption of learning. The described RPU and resulting ANN architecture improve overall ANN performance and enable a broader range of practical ANN applications.

Figure 10:
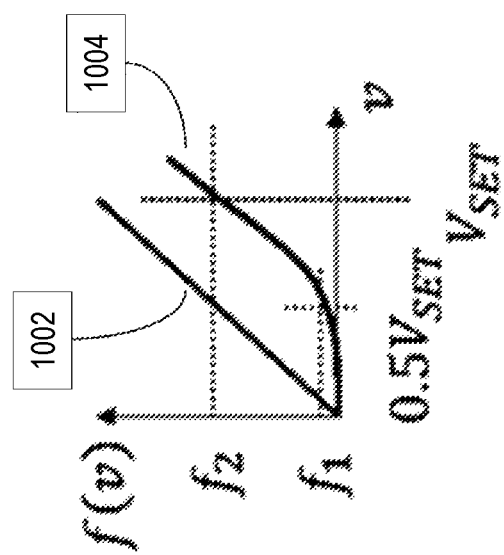
FIG. 10 is a diagram of the voltage switching behavior of a resistive processing unit in accordance with one or more embodiments.

Referring now to FIG. 10, a graph illustrating a comparison between an ideal memristor and an RPU of the present embodiments is shown. The vertical axis represents device state change at a particular voltage, the horizontal axis represents the voltage applied. In an ideal memristor operation, a change in resistance is linearly proportional to the voltage applied to the device. Thus, as soon as the memristor sees any voltage, its resistance state changed. This is shown by curve 1002, which shows that the change in state is dramatic even at low voltages.

For RPU devices, shown by the curve 1004, there is a well-defined set voltage, $V_{SET}$, that the device needs to see to change its internal resistance state. For such a device, a bias voltage of 0.5 $V_{SET}$ will not change the internal resistance state. In the present embodiments, this non-linear characteristic of the RPU device is used to perform multiplication locally. Assuming $f_1$ is small, the device does not change its internal state when only 0.5 $V_{SET}$ is applied. Notably, the FIG. 10 shown is with only positive voltages and positive changes to the resistive state of the RPU device, but a similar relationship between negative voltages and negative resistance changes also exists.

Figure 11:
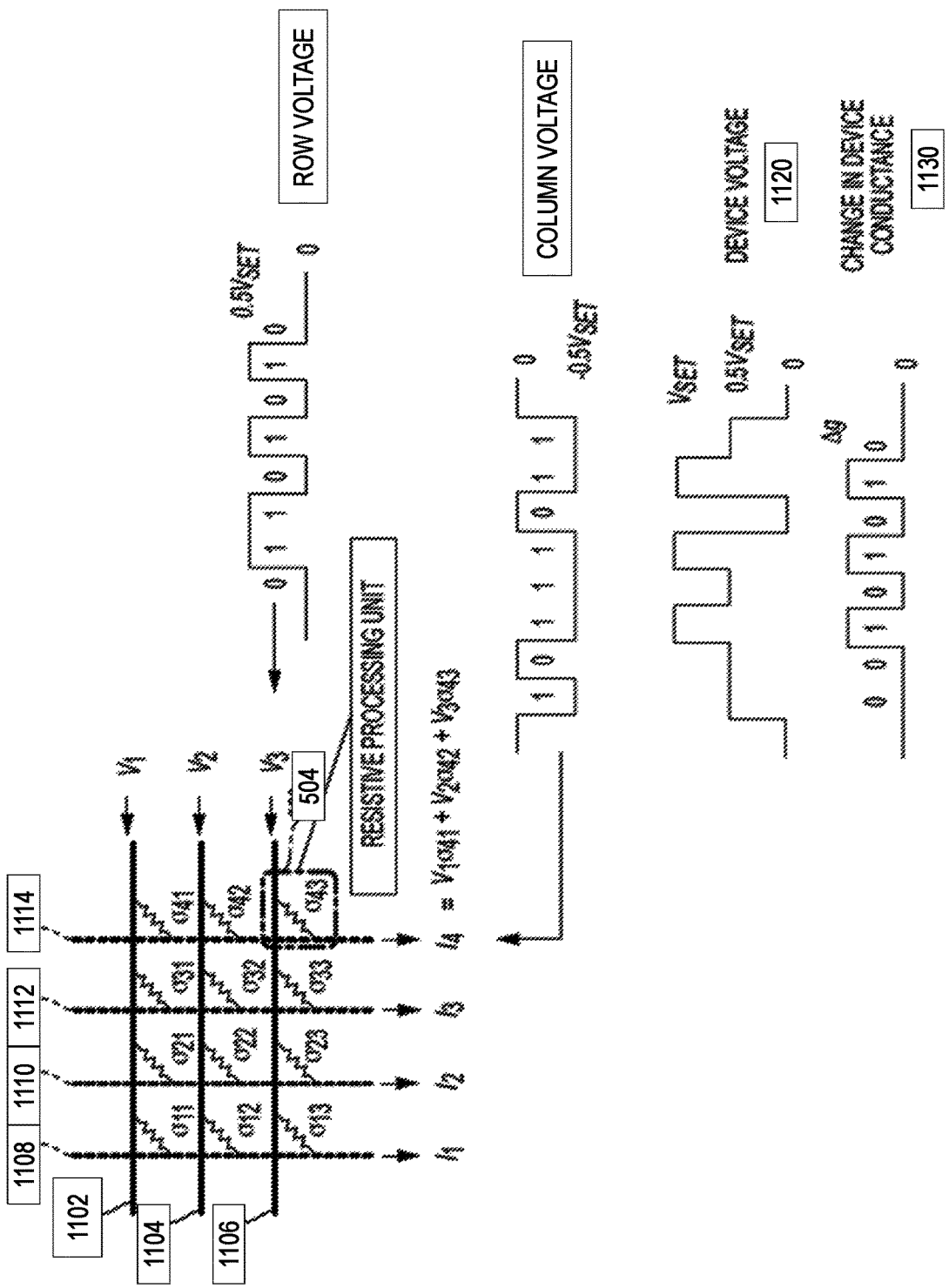
FIG. 11 is a diagram of a weight update operation in accordance with one or more embodiments.

Referring now to FIG. 11, an operation of positive weight updates for an RPU device is shown. A row voltage sequence 1102 is shown as a sequence of voltage pulses, one at each weight update, either having a voltage of zero or a voltage of +0.5$V_{SET}$. A column voltage sequence 1108 is shown as a sequence of voltage pulses, either having a voltage of zero or a voltage of −0.5$V_{SET}$. It should be understood that these sequences represent a positive resistance change phase of the weight update. After the positive weight updates are performed, a separate set of sequences, with the polarity of the respective voltages reversed, is used to update weights in a negative direction for the weights 504 that need such correction.

At each weight update phase, the two voltages align for a given RPU to produce the device voltage sequence 1120, which ranges from 0 to $V_{SET}$. This results in a change in device conductance as shown in the sequence 1130, where device conductance changes only when the voltage reaches $V_{SET}$, such that the device state is changed only when both transmit a '1' bit.

Referring to FIG. 9, the update generators 916 encode the numbers as stochastic bit streams, where each bit is encoded with a voltage pulse height. For example, if 4/8 is encoded by the row voltage 1102 and 6/8 is encoded by the column voltage 1106. The overlapping signal 1120, defined by the difference between the column and row voltages seen by the cross point device, has three voltage steps. The stored weight proportional to the product of the two stochastic numbers (here shown as $$\frac{4}{8} \times \frac{6}{8} = \frac{3}{8})$$

is stored as the value of the weight of device 504.

As illustrated in FIG. 6, the capacitor 650 stores a sum of outputs from each weight 504 from a corresponding set of the weights 504. The output of each weight 504 is the product of the stored weight (represented by the conductance) and the input value. The capacitor 650 temporarily stores the sum of the products in response to the forward pass initiation. The stored sum is further propagated to the preceding layer during the backward pass and used for updating the weight values stored at the weights 504 during the weight-update pass, as described herein.

Figure 12:
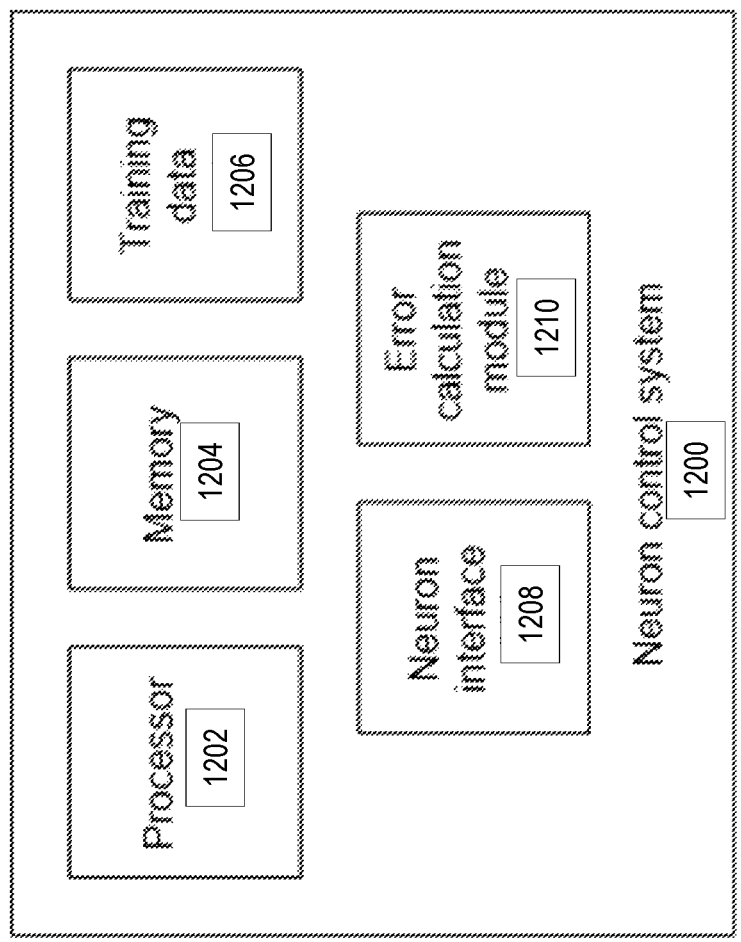
FIG. 12 is a block diagram of a neuron control system in accordance with one or more embodiments.

Referring now to FIG. 12, a neuron control system 1200 is shown. The neuron control system 1200 includes a hardware processor 1202 and memory 1204. Training data 1206 for an ANN is stored in the memory 1204 and is used to train weights of the ANN. A neuron interface 1208 controls neurons on the ANN, determining whether the neurons are in feed forward mode, back propagation mode, or weight update mode. The neuron interface 1208 furthermore provides inputs to input neurons and receives the output from output neurons. An error calculation module 1210 compares the outputs from the neurons to training data 1206 to determine an error signal. Neuron interface 1208 applies the error signal to the output neurons during a back propagation mode and subsequently triggers a weight update mode to train the weights of the ANN accordingly.

The technical solutions described herein thus facilitate attaching a capacitor to store the input/output of layers of a neural network in ANN. The technical solutions facilitate implementing a hidden layer of the neural network using capacitor for temporary storage and with clocking circuitry to propagate the weight to other layers of the neural network during forward and/or backward passes. Further, the technical solutions facilitate updating the weights of the neural network using the weight stored in the capacitor. As described herein, the technical solutions facilitate storing the weight in the capacitor and propagating the weight from the capacitor to the other layers using the clocking circuits to direct flow of the charge in the capacitor. Thus, the technical solutions address the technical problem of backpropagation in neural networks by facilitating a neural network with storage for percepton output in each node itself, and providing clocking circuits for forward and backward propagation.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A system for implementing a neural network, the system comprising:
    a crosspoint array comprising a plurality of nodes, each node representing a weight assigned to a neuron of the neural network;
    a capacitor associated with a set of nodes from the plurality of nodes, wherein the capacitor is configured to store a current value corresponding to a sum of outputs from each respective node from the set of nodes; and
    a clocking circuit comprises a first clocking device, a second clocking device, a third clocking device, and a fourth clocking device, wherein the clocking circuit is configured to:
        initiate a forward pass to propagate the current value stored in the capacitor to a subsequent layer of the neural network by setting the second clocking device and the third clocking device;
        initiate a backward pass to propagate the current value stored in the capacitor to a preceding layer of the neural network by setting the first clocking device and the third clocking device; and
        initiate a weight-update pass to update the weights in the neural network by setting the second clocking device and the fourth clocking device.

2. The system of claim 1, wherein the capacitor stores the sum of outputs from each respective node from the set of nodes in response to a forward pass initiation.

3. The system of claim 1, wherein the capacitor propagates the stored current value to the preceding layer of the neural network in response to the backward pass initiation.

4. The system of claim 1, wherein the weights of the neural network are updated based on the value stored in the capacitor and an error signal received from the subsequent layer of the neural network.

5. The system of claim 1, wherein the crosspoint array comprises:
    a set of conductive row wires;
    a set of conductive column wires configured to form a plurality of crosspoints at intersections between the set of conductive row wires and the set of conductive column wires; and
    a two-terminal RPU at each of the plurality of crosspoints.

6. The system of claim 5, wherein the two-terminal RPU comprises:
    a first terminal;
    a second terminal; and
    an active region having a conduction state;

wherein the active region is configured to effect a nonlinear change in the conduction state based on at least one first encoded signal applied to the first terminal and at least one second encoded signal applied to the second terminal.

7. A crosspoint array for implementing a neural network, the crosspoint array comprising:
a set of conductive row wires;
a set of conductive column wires configured to form a plurality of crosspoints at intersections between the set of conductive row wires and the set of conductive column wires;
a memristor at each of the plurality of crosspoints configured to store a weight of the neural network;
a capacitor associated with a set of crosspoints from the crosspoint array, wherein the capacitor is configured to store a current value corresponding to a sum of outputs from each respective memristor from the set of crosspoints; and
a clocking circuit, which comprises a first clocking device, a second clocking device, a third clocking device, and a fourth clocking device, wherein the clocking circuit is configured to:
initiate a forward pass to propagate the current value stored in the capacitor to a subsequent layer of the neural network by setting the second clocking device and the third clocking device;
initiate a backward pass to propagate the current value stored in the capacitor to a preceding layer of the neural network by setting the first clocking device and the third clocking device; and
initiate a weight-update pass to update the weights in the neural network by setting the second clocking device and the fourth clocking device.

8. The crosspoint array of claim 7, wherein the memristor comprises a two-terminal resistive processing unit (RPU).

9. The crosspoint array of claim 8, the two-terminal RPU comprises:
a first terminal;
a second terminal; and
an active region having a conduction state;
wherein the active region is configured to effect a nonlinear change in the conduction state based on at least one first encoded signal applied to the first terminal and at least one second encoded signal applied to the second terminal.

10. A non-transitory computer program product for implementing a neural network, the computer program product comprising a computer readable storage medium, the computer readable storage medium comprising computer executable instructions, wherein the computer readable storage medium comprises instructions to:
set one or more clocking devices from a clocking circuitry of a crosspoint array,
wherein the crosspoint array comprises:
a set of conductive row wires;
a set of conductive column wires configured to form a plurality of crosspoints at intersections between the set of conductive row wires and the set of conductive column wires;
a plurality of memristors, wherein a memristor is at each of the plurality of crosspoints, and the memristor configured to store a weight of the neural network; and
a plurality of capacitors, wherein a capacitor is associated with a corresponding set of crosspoints from the crosspoint array; and
the clocking circuitry comprises a first clocking device, a second clocking device, a third clocking device, and a fourth clocking device, and wherein executing the instructions causes the clocking circuitry to:
initiate a forward pass that comprises storing, in the capacitor, a current value corresponding to a sum of outputs from each respective memristor from the corresponding set of crosspoints, and propagating current values stored in the capacitor to a subsequent layer of the neural network by setting the second clocking device and the third clocking device.

11. The non-transitory computer program product of claim 10, wherein the computer readable storage medium further comprises instructions to initiate a backward pass to propagate the current value stored in the capacitor to a preceding layer of the neural network by setting the first clocking device and the third clocking device.

12. The non-transitory computer program product of claim 10, wherein the computer readable storage medium further comprises instructions to initiate a weight-update pass to update the weights in the memristors by setting the second clocking device and the fourth clocking device.

* * * * *